United States Patent

[11] 3,613,974

| [72] | Inventors | Roger Chatelain;<br>Hugues Bouis, both of Thourotte, France |
|---|---|---|
| [21] | Appl. No. | 829,823 |
| [22] | Filed | Mar. 10, 1969 |
| [23] | | Division of Ser. No. 429,802,<br>Feb. 2, 1965, Pat. No. 3,474,944 |
| [45] | Patented | Oct. 19, 1971 |
| [73] | Assignee | Compagnie De Saint-Gobain<br>Neuilly-sur-Seine (Seine), France |
| [32] | Priority | Feb. 4, 1964, Jan. 13, 1965 |
| [33] | | France |
| [31] | | 962564 and 1735 |

[54] APPARATUS FOR CUTTING GLASS
13 Claims, 10 Drawing Figs.

[52] U.S. Cl. .................................... 225/93.5,
33/27, 83/6, 83/565, 225/96, 225/103
[51] Int. Cl. .................................... B26f 3/06

[50] Field of Search............................................. 225/2, 1,
96, 96.5, 93.5, 103; 83/6, 8, 12, 565; 33/27, 18, 23

[56] References Cited
UNITED STATES PATENTS

| 2,270,418 | 1/1942 | Crowley et al. ............... | 33/27 |
| 2,291,451 | 7/1942 | Craig et al. .................... | 225/2 |
| 2,507,841 | 5/1950 | Upton ............................ | 225/2 |
| 3,171,207 | 3/1965 | Wormser ....................... | 33/23 |

FOREIGN PATENTS

| 1,815 | 6/1869 | Great Britain................ | 83/6 |
| 1,336,843 | 7/1963 | France ........................... | 225/2 |

Primary Examiner—Frank T. Yost
Attorney—Bauer and Seymour

ABSTRACT: An apparatus to cut a length of flat glass into useful panels of any desired shape with as little as 1 cm. between contiguous scores of successive panels. Wastage of glass by inefficient cutting is reduced. Heat is applied adjacent the scored line to effect the separation.

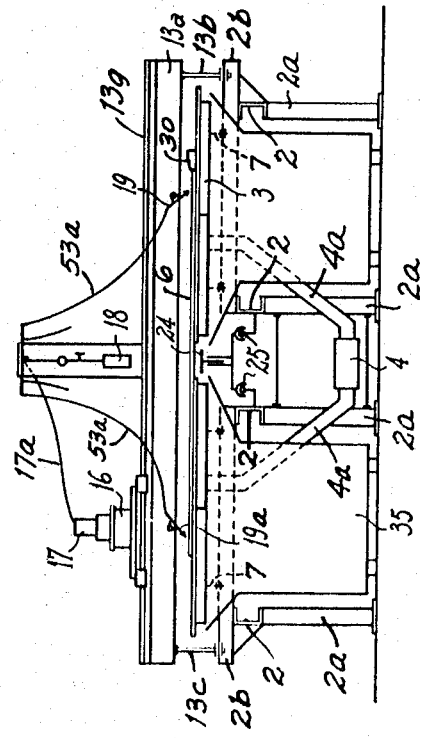
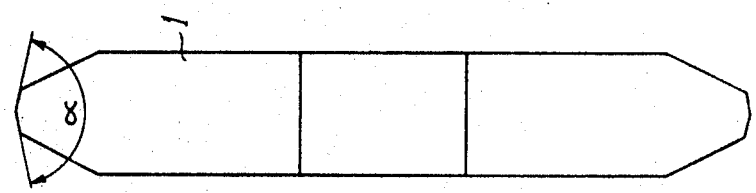

ROGER CHATELAIN
HUGUES BOUIS

By Bauer and Seymour
Attorneys

INVENTORS.
ROGER CHATELAIN
HUGUES BOUIS

APPARATUS FOR CUTTING GLASS

This application is a division of application Ser. No. 429,802, filed Feb. 2, 1965 and, as such, is entitled to the foreign filing dates of the original applications filed in France, namely, PV 962,564 of Feb. 4, 1964, and PV 1735 of Jan. 13, 1965.

This invention relates to the cutting of glass and, more particularly, to a method of and an apparatus for the cutting of shaped panels from a sheet or ribbon of glass of indefinite length. While not limited to any particular use, shape or contour of panels, the invention is especially well adapted to the cutting of panes for use in the windshields and windows of automobiles.

The cutting of panels of glass, particularly those having curved edges, is customarily effected by a scoring tool guided in a path corresponding to the desired shape or outline of the panel, to form a scored line. After this forces are applied to the sheet which cause the complete separation of the panel along the scored line. The force initiating rupture of the glass along the scored line is usually applied just outside the scored line.

The prior art procedure as just outlined has certain disadvantages in that it does not readily lend itself to complete automation. Furthermore it does not enable the cutting of pieces or panels having one or more curved edges, in succession from a ribbon of glass of indefinite length. As a result it was formerly required to first separate a long or continuous ribbon of glass into discrete sheets each having dimensions appreciably greater than the overall dimensions of the shaped panel to be cut therefrom. This inevitably resulted in an excessive waste of glass.

The present invention has for its principal object the provision of a method and an apparatus by which a long or continuous ribbon of glass may be cut up into panels of any desired shape or contour, with a minimum spacing of as little as 1 cm. between contiguous scored lines of successive panels. Thereby, waste of usable glass is kept at a minimum and the time and expense of first separating the ribbon into discrete rectangular pieces are eliminated.

Another main object is the provision of a method and apparatus which make possible the complete automation of cutting a ribbon of glass into successive panels of a wide variety of predetermined shapes and sizes.

Yet another object is the provision of a method and apparatus which effect the breakage into a number of pieces, of the band surrounding the cut panel after the scored line has been completed thus enabling a minimum of spacing between contiguous scored lines of successive panels, and a maximum number of panels per unit length of a long or continuous ribbon of glass.

In amplification of the object stated in the immediately preceding paragraph, after the score line of any one panel has been completed, the ribbon of glass is advanced by the distance required for each panel to thus move the first panel and its encircling band of glass to a first position, a second panel is cut, the sheet is again advanced by the aforesaid distance to further advance the first panel to a second location. At this second location heat is applied to the band of glass surrounding the first panel. The heat is applied at a preselected number of points spaced just outside the scored line, thus causing the band to break and drop away, leaving intact the first panel. The procedure also leaves intact the second panel and its surrounding band of glass. During the heating of the band surrounding the first panel, a third panel is scored and the procedure is repeated indefinitely.

Another object is the provision of a method and apparatus by which the band of glass externally of and encircling the cut panel, is broken or fragmented at definite locations which assure that the lines of fracture follow the scored line precisely and do not extend into the panel itself.

Still another object is the provision of a method and apparatus wherein the band of glass as mentioned in the preceding paragraphs, drops away after being broken, thus leaving the cut panel free for unobstructed translation to a point of packaging or use.

A further object is the provision of a method and apparatus by which the encircling band of glass is broken into a selected number of discrete pieces by the application thereto of heat at points advantageously selected with respect to the particular shape of the panels being cut.

Yet another object ancillary to that described in the preceding paragraph is an arrangement by which the points of application of heat may be selectively changed in accordance with changes in shape of the panels being cut.

Another object is the providing of a method and apparatus which enables the cutting of a long or continuous ribbon of glass, into panels of predetermined contour, while so locating the panels as to avoid the inclusion therein of defective areas of glass, to thereby assure that each panel is cut from perfect glass while, at the same time, discarding defective areas with a minimum loss of usable glass.

Another object in connection with the clean breakage of the encircling band, is the provision by means of which intense heat is rapidly and preferably simultaneously applied to each of the aforesaid selected points of the band to thus create a shock at each point, causing the band not only to break away cleanly along the scored line but also to fragment at these points so that the pieces drop away and may be automatically collected or conveyed away to a place of disposal.

More specifically it is an object to provide an apparatus for the application at each point, of an oxyacetylene flame of intense heat but of such controlled and brief duration that the heat does not have time to travel to contiguous areas surrounding the point.

A further object is the provision of a cutting or scribing tool which is so shaped as to effect a deep fissure in the glass along the line of scoring and which, by the application of a proper and preselected force thereto, effects complete opening of the fissure without the application of external and extraneous break out forces.

Still another object is the provision of a scoring tool which effects a clean smooth cut normal to the surface of the sheet and which does not require further processing such as grinding, to remove rough edges, splinters, etc.

Yet another object is the provision of a tool which, by the application thereto of a force dependent upon the apex angle of its conically-shaped end, the state or condition of the glass, particularly its degree of annealing, and the speed of movement of the tool along the path of travel thereof, produces a fissure which propagates deeply into the sheet and usually extends to the opposite face thereof.

Other objects and advantages of the invention will become obvious to those skilled in the art, after a study of the following detailed description in connection with the accompanying drawing.

In the drawing:

FIG. 3 is an end view looking from left to right, FIG. 2;

FIG. 7 is an enlarged profile view of a cutting tool embodying features of the invention and for use in connection with the apparatus of FIGS. 1 through 4;

Figure 1:
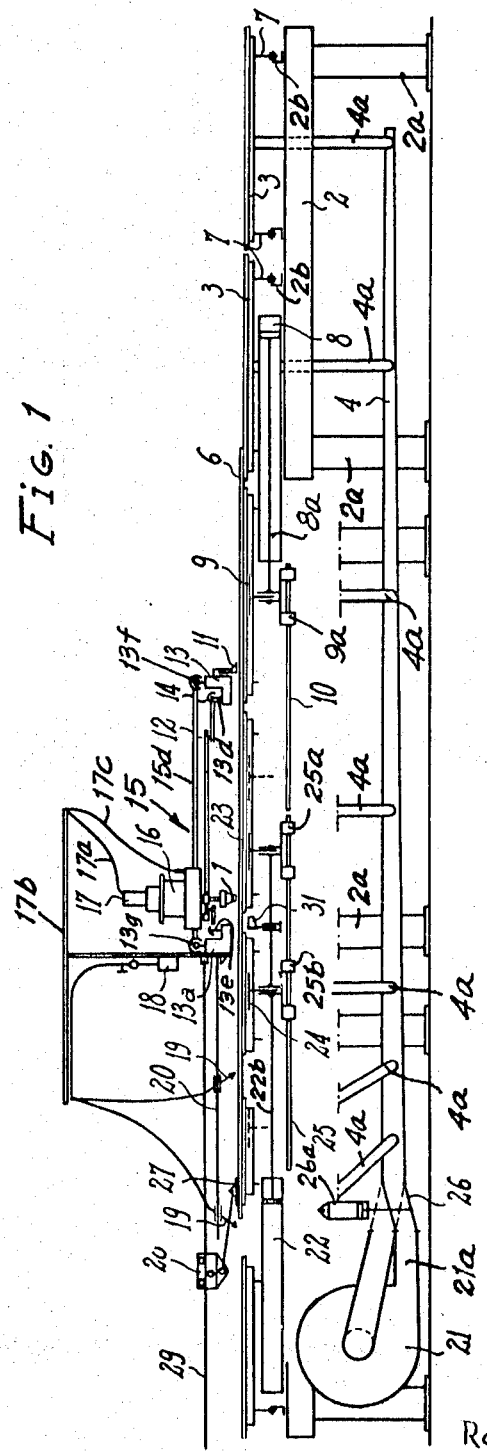
FIG. 1 is a side elevation of an apparatus for the continuous and automatic cutting of a ribbon of glass of indeterminate length, into panels of desired size, shape and contour.
Figure 2:
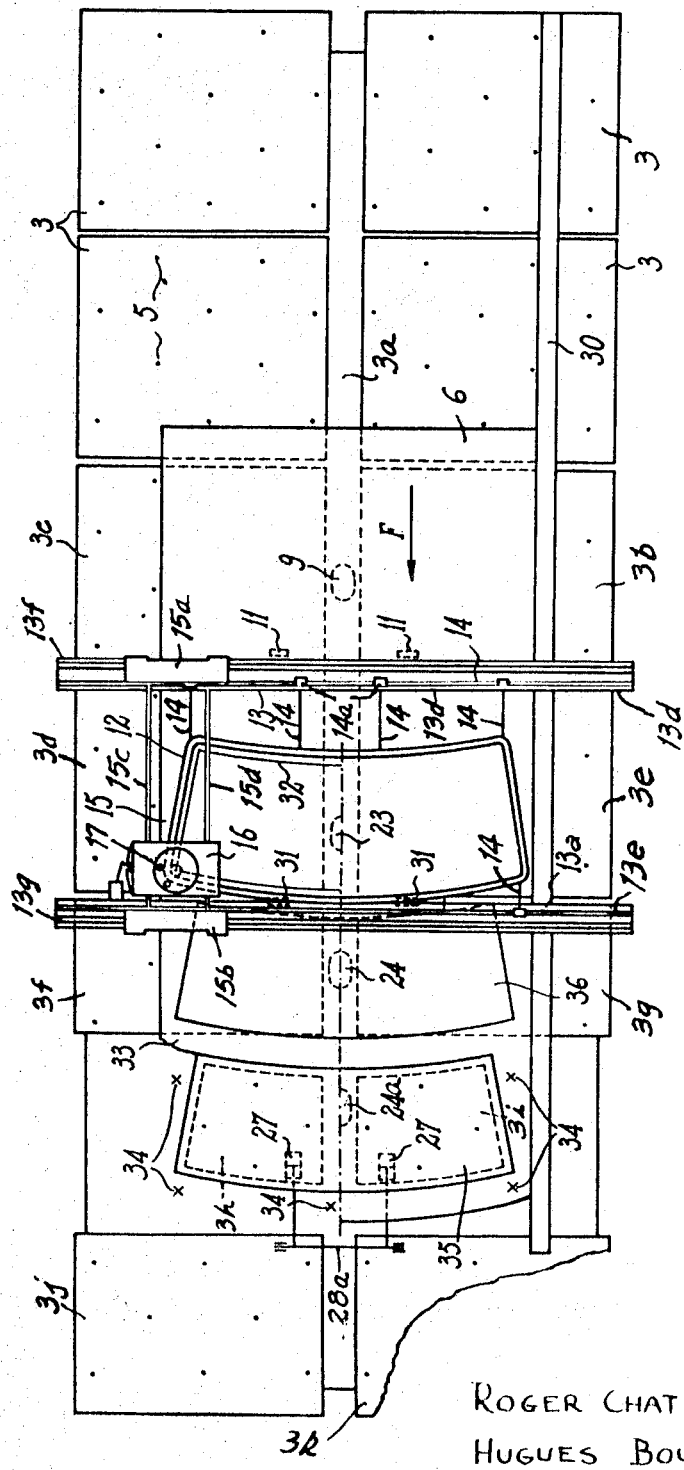
FIG. 2 is a plan view of the apparatus of FIG. 1.
Figure 4:
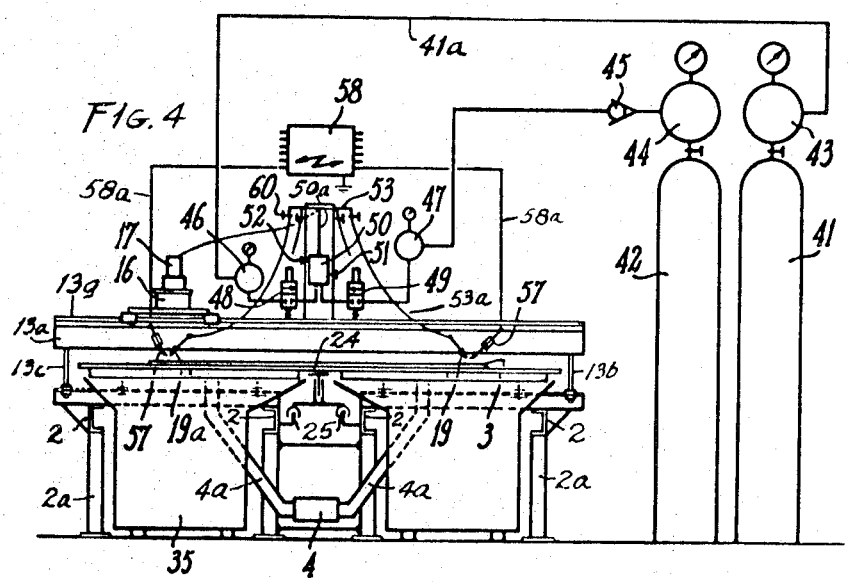
FIG. 4 is a view corresponding to FIG. 3 but showing the machine equipped with fuel supply igniting means, and controls to automatically apply heat to the glass at the selected points.

Referring in detail to FIGS. 1 to 4, a frame is formed of a series of longitudinally extending horizontal beam sections 2, supported by legs 2a. Reference to FIGS. 3 and 4 shows that there are four laterally spaced series of beam sections, the sections of each series being in end-to-end relation. A number of cross-beams or channels 2b rest upon and are rigidly attached to and supported by beam sections 2. Referring to the right-hand end portion of FIG. 1 it is noted that channels 2b are arranged in pairs. Thus the extreme right-hand pair support table sections 3 through the intermediary of jacks 7 which may be simply threaded rods fixed at their upper ends to and depending from the respective table sections. The lower threaded end of each rod passes through a respective hole in the upper flange of a channel 2b. A pair of nuts threaded on each rod above and below the flange, respectively, enable vertical adjustment and leveling of the corresponding table section. There are four of these rods 7 for each table section, one adjacent each corner thereof, so that each section 3 may be given a very fine adjustment to level it and to assure that the flat tops of all sections are coplanar. Reference to FIG. 2 shows that in the model there depicted there are fourteen of these sections 3, each section forming a pair with the one laterally opposite and each forming one of a series seven extending longitudinally. The table sections are conveniently spaced apart to define a central longitudinal space 3a, FIG. 3. Likewise each pair of table sections is spaced a relatively short distance from the next adjacent pair. However, the pair 3h, 3i are shaped to conjointly correspond generally to the shape of the panels to be cut and may be interchanged when the machine is shifted to cut panels of a different size or shape.

Except for sections 3h, 3i, as previously explained, all are essentially alike and each is a built-up element comprising a flat metallic top having a number of regularly geometrically arranged holes 5. Each section has a bottom wall supported in vertically spaced relation with its top wall by four sidewalls to form a shallow, hollow, parallelepipedal compartment. Each lower or bottom wall is imperforate except for a central opening in which the upper end of an upwardly- and outwardly inclined pipe or tuyere 4a has a pressuretight fit. A conduit 4 extends horizontally between the two inner sets of legs 2a, FIG. 3. The conduit is conveniently rectangular in transverse section and uniformly decreases in cross section, left to right, FIG. 1. Each pipe 4a has a pressuretight connection at its lower end with a respective sidewall of conduit 4. Comparing FIGS. 1 and 3 it is noted that each table section is provided with one of these tuyeres.

At its left end as viewed upon FIG. 1, conduit 4 is connected through a two-way valve 26 with the outlet or discharge 21a of a blower 21. The valve may consist of a pair of vanes in relatively fixed parallel relation and pivotable from a first lower position shown, wherein all air from blower 21 is directed into conduit 4, to a second or upper position wherein conduit 4 is fully connected to the intake or exhaust pipe of the blower. Valve 26 is connected for operation between these two limiting positions, with the piston of a fluid pressure cylinder 26a. The cylinder is double acting so that by admitting pressure fluid to one end or the other, through control piping not shown, the valve may be positively moved into one or the other of its limiting positions aforesaid. Thus when valve 26 is in the first or lowermost position shown, positive or above-atmospheric pressure is applied to the interior of each table section 3 resulting in the emission of air from each orifice 5. On the other hand, when valve 26 is in its upper limiting position the pressure in conduit 4 and each table section is below atmospheric and air is drawn in through each orifice 5 not covered by a sheet of glass supported thereon. In the first position a sheet over any table section is supported on a cushion of air from orifices 5. In the second position the sheet is held to the section by suction. In the fully automated apparatus, admission of pressure fluid such as oil, to cylinder 26a will be under control of a balanced solenoid piston valve energized from a master controller which will effect all necessary operations of the machine in the proper sequence, as subsequently described.

A longitudinally extending straight edge 30, FIG. 2, extends over and in contiguous relation with all but the final pair of table sections and acts as a guide against which one side edge of the sheet abuts. By means not shown, such as horizontally acting screwjacks, this straight edge may be horizontally translated for adjustment transversely of arrow F, FIG. 2, which arrow shows the direction of movement of the ribbon of glass being processed.

A friction pad 9 is mounted in central space 3a between the third pair of table sections, counting from the left, FIG. 2. The friction pad is mounted by carriage 9a on a pair of horizontal transversely spaced, longitudinally extending tracks 10, FIG. 1. Although but one of these tracks is shown upon the figure, each track is in alignment with a respective one of tracks 25, FIGS. 1 and 3, as subsequently explained.

Tracks 10 extend over a distance longitudinally along the apparatus, to enable friction pad 9 to pick up that portion of the glass ribbon over table sections 3b, 3c, FIG. 2, and advance the ribbon in the direction of arrow F until the aforesaid portion is over the next adjacent pair of table sections.

An elongated power cylinder 8, FIG. 1, is horizontally and longitudinally fixed with frame 2 beneath the table sections, and has a piston and piston rod assembly 8a connected at its free end exteriorly of the cylinder, with friction pad 9. The cylinder is of the double acting type so that by the admission of pressure to one end or the other of the cylinder, through pipes not shown, suction head 9 may be positively translated between its limiting positions on and along tracks 10 to thus advance the ribbon of glass by the necessary distance required for the cutting of one panel such as is identified at 35, FIG. 2. It will be understood that admission of pressure fluid to cylinder 8 is under the control of a balanced solenoid valve, not shown, which in turn, is controlled by the aforesaid master controller to operate element 9 in proper sequence with other and subsequently described parts of the invention. Movement of the sheet over the table by subatmospheric pressure in head 9 is assisted, of course, by jets of air emerging from orifices 5.

Reference to FIG. 3 shows that channels 2b at the forward and rearward termini of table sections 3e, 3d, are extended outwardly at each end beyond frame longitudinals 2. At each extended end of these channels there is an upright column such as 13b, 13c. Each column forms a pair with the one transversely opposite and each pair supports a respective one of two parallel horizontal transverse longitudinally spaced guides 13, 13a extending over and across the table sections and the ribbon of glass thereon.

As shown in FIG. 1 these sections are generally L-shaped in cross section, the two being allochiral duplicates with bases projecting toward each other. Each of these base portions has a respective one of two tracks 13d and 13e fixed thereon in transversely parallel relation and upstanding therefrom. A pattern or scriber guide 12 is shown in the general outline of an automobile windshield pane. The pattern may be a closed or endless strip of metal and is supported by and from tracks 13d, 13e, by a number of arms 14. As clearly shown upon FIG. 1 each arm 14 is fixed at its inner end to the underside of the pattern and at its outer end carries a slide head 14a which fits down over the top of a corresponding one of tracks 13d and 13e. Referring to FIG. 2 it is noted that in the model shown there are four of these arms 14 carried by track 13d, and four carried by track 13e. The pattern is thus firmly supported by and between guides 13, 13a, for limited adjustment on and along tracks 13d, 13e. Any suitable means such as setscrews carried by the respective heads 14a and engaging a corresponding one of the tracks, may be provided to secure the pattern in adjusted position transversely of the subjacent table sections to thereby accurately locate the pattern over and with respect to the ribbon of glass being processed. It is important to note that the upper face and both side edges of the pattern are free and clear.

At its top each vertical leg of guides 13, 13a has a track 13f, 13g, respectively, fixed thereto and upstanding therefrom, FIGS. 1 through 4, and which conjointly define a horizontal plane above and parallel with that defined by tracks 13e, 13d.

A first carriage 15a is mounted for guided translation on and along track 13f. A line and second carriage 15b is similarly mounted on track 13g. These carriages are rigidly interconnected by a pair of longitudinally extending parallel, laterally spaced guide rods 15c, 15d. The carriages 15a, 15b, and rods 15c, 15d, conjointly form a bridge 15; and from FIG. 1 it is seen that this bridge rides above and spaced from pattern 12.

A power driven rotary cutting or scribing tool assembly is identified generally at 16 and consists essentially of a casing having horizontal parallel guides or bores each adapted to ride on a respective one of the rods 15c, 15d for guided translation thereon in a path parallel with arrow F. The tool assembly includes a rotary scribing or cutting tool 1, FIGS. 1 and 5, and journaled for rotation in the assembled casing about a vertical axis. The tool holder and shaft by which it is rotated are driven from an electric motor 17, through a reduction gearing enclosed within the casing and supplied with current over a flexible cable 17a. The cable continues through one arm of a T-shaped suspension tube 17b thence downwardly through the vertical leg thereof to a junction box, not shown. The cutting tool and its assembly 16 are thus mounted for universal horizontal movement over and above a ribbon of glass on table sections 3. The component of movement parallel with arrow F results in translation of assembly 16 on and along rods 15c, 15d, while the component horizontally normal to the arrow results in translation of the assembly and bridge 15 as a unit, on and along tracks 13f, 13g.

At the level of the plans of pattern 12 the cutting tool assembly has roller or other antifriction means engaging opposite side of the pattern for guidance thereby.

Figure 8:
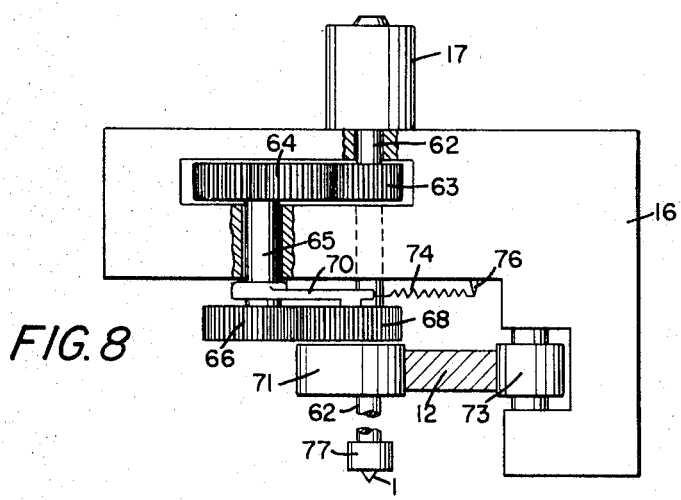
FIG. 8 is a detail elevational view, partly in section, to an enlarged scale, of means by which the cutting tool is power driven in guided translation along the pattern.
Figure 9:
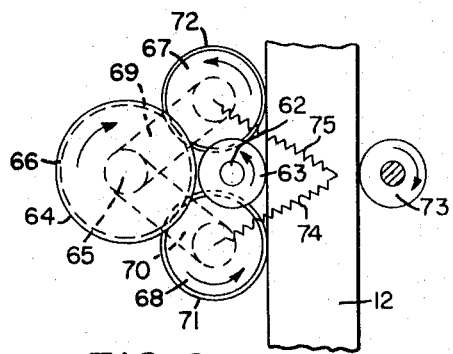
FIG. 9 is a plan view corresponding to FIG. 8.

Referring to FIGS. 8 and 9, 12 shows a portion of the pattern in transverse section, and 16 indicates the scribing tool frame, carrying motor 17. Motor shaft 62 has pinion 63 fixed thereon, meshing with second pinion 64 fixed to the top end of an idler shaft 65 journaled in the frame. The lower end of this shaft has pinion 66 fixed thereto and meshing with a pair of driving pinions 67, 68, FIG. 9.

Referring in particular to FIG. 9, a pair of levers or arms 69, 70 are independently pivoted at their contiguous superposed ends, upon shaft 65. At its other end, arm 70 has the pinion 68 journaled thereon and coaxially fixed to and with a roller 71. As shown, this roller frictionally engages one side edge of pattern 12. Likewise, arm 69 has a driving pinion 67 journaled thereon and meshing with pinion 66. Pinion 67 is integrally attached to and coaxially of subjacent roller 72 also frictionally engaging the same side edge of the pattern 12.

The other side edge of the pattern is contacted by an abutment roller 73 journaled for rotation on a vertical axis in frame 16. A pair of springs 74, 75 have one end each connected at 76 to a convenient part of the frame. Their other ends are attached to the distal ends of arms 69 and 70, respectively.

By the foregoing construction the tension in the springs urges the arms 69, 70 into clockwise and counterclockwise rotations, respectively. This rotation is opposed by idler or abutment roller 73 to that in an obvious way, (a) rollers 71 and 72 are constantly urged into frictional contact with the side edge of the pattern while at the same time, frame 16 is securely held in contact with the pattern for guided translation therealong, by and in response to the equal rotation of rollers 71, 72. In FIG. 9, rotation of these rollers in the directions indicated by the arrows, causes the assembly to move downwardly, as view on the figure.

Figure 10:
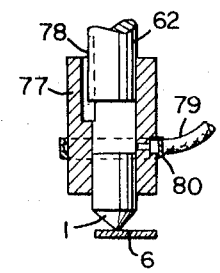
FIG. 10 is a detail axial section showing means by which the cutting tool may be urged with variable force, into contact with the sheet material to be cut.

From FIGS. 8 and 9 also, it is seen that motor shaft 62 extends downwardly through suitable bearings, not shown, in frame 16, between friction or driving rollers 71, 72 and has a holder 77 for cutting tool 1, splined to its lower end, noting FIG. 10 also. The tool is thereby rotated upon its central vertical axis of symmetry and in timed relation with the linear rate of travel of the assembly 16 along the pattern. Of course, it is within the purview of the invention to provide a separate motor for driving the assembly along the pattern, in addition to the one for rotating the tool about its own vertical axis of symmetry.

The construction is such that the axis of rotation of the tool itself is caused to travel in a path 32, FIG. 2, just inside and at a predetermined fixed radial distance inwardly from the inner edge of the pattern. This path is precisely that of the desired shape and size of the panel to be cut; and by means of interchangeable arms 14 or by means of arms of adjustable length, patterns of various sizes and shapes may be substituted and mounted in place of the one shown.

The shaft 62 on which tool 1 is mounted and by which it is rotated, is preferably in two spline-connected sections so that they are constrained to rotate as a unit but the lower section carrying tool 1 may be vertically raised and lowered from and onto the ribbon of glass.

As shown on FIG. 10, tool 1 may be fixed in the lower end of a tubular holder 77 having splined connection at 78 with the lower end of shaft 62 so that the tool and holder may have nonrotative but axially sliding movement with respect to the shaft. A flexible tube 79 for fluid under pressure is in communication with the interior of holder 77, by a fitting 80 so that in a way clear from inspection of the figure, the controlled admission of pressure fluid into the interior of sleeve or holder 77, forces the tool downwardly into contact with glass sheet 6, with a selectively variable force. It will be noted from FIG. 2 that carriages 15a and 15are so shaped that they can resist an upward reaction force without becoming detached from their respective tracks 13f, 13g. Thus with the pattern 12 properly positioned and the ribbon of glass properly located beneath it, motor 17 can be energized whereupon the cutter will begin to rotate and the assembly frame will begin to travel along the pattern in movement guided thereby. Then the master controller will effect the introduction of pressure fluid into the cylinder, not shown, thus forcing tool 1 with predetermined force into scribing contact with the glass. After the tool has made a full traverse of the pattern pressure fluid is introduced into the other end of the cylinder and exhausted from the first end, to raise the tool from the glass. Motor 17 may be allowed to continue in operation or it may be automatically deenergized by completion of the incision in the glass, as by tripping of a switch on the tool by a latch or abutment on the pattern.

Although as subsequently described the particular cutting tool forming a part of the invention effects a deep incision or fissure extending nearly or completely through to the lower surface of the glass, the encircling band of glass external of scored line 32 is not immediately removed or broken away. Instead the scribed panel and its surrounding band of glass are shifted in the direction of arrow F to a new location or station over table sections 3f, 3g. While cutting of the panel was being effected, the master controller had shifted valve 26 so that subatmospheric pressure or vacuum, existed in table sections 3. This action operates to hold the glass immobile while being scored or cut. When scoring of a panel has been completed, valve 26 is automatically operated by the same action which stops motor 17, to again apply above-atmospheric pressure so that jets of air issuing from orifices 5 again support the glass.

Referring to FIGS. 1 and 3, a pair of tracks 25 are fixed in horizontal, parallel, longitudinal position below space 3a between table sections. Inspection of FIG. 1 shows that the right ends of these tracks 25 lie adjacent a transverse vertical plane through the left ends of tracks 10. Tracks 25, like tracks 10 are supported by brackets fixed to frame 2 and, in turn, support carriages 25a, 25b each having runners engaging and guided by the tracks so that they are limited to translation therealong in the direction of arrow F.

At its left end as viewed upon FIG. 1, frame 2 mounts a horizontal, longitudinally extending power cylinder 22 having piston 22a movable therein. This piston is connected with one end of rod 22b. The other end of the rod is attached to both carriages 25a, 25b. Cylinder 22 is double acting so that piston 22a may be positively driven in either direction by the introduction of pressure fluid to one end or the other of the cylinder through a four-way solenoid operated valve whose energization is controlled by the master controller.

FIG. 1 shows that carriages 25a and 25b mount friction pads 23 and 24, respectively. From FIG. 2 it is seen that pad 23 lies in space 3a between table sections 3d, 3e, while pad 24 lies between sections 3f, 3g. A third pad 24a, FIG. 2, is similarly mounted upon a carriage not shown, but mounted for guided translation on tracks 25 in the same manner as 25a and 25b. Pad 24a lies in the space between the two pairs of table sections 3h, 3i.

Each of the friction pads 9, 23, 24 and 24a is carried by a respective one of an equal number of piston rods each of which is connected at its lower end to a piston slidably fitting a fluid pressure cylinder. Each cylinder may be single acting so that the introduction of pressure fluid into its lower end raises its pad upwardly into contact with the lower surface of the glass. In such an arrangement the weight of the pad will be sufficient to cause it to drop out of contact with the glass on release of pressure from its cylinder. Alternatively each cylinder may be double acting to provide for positive and rapid lowering of its pad when pressure is released from its lower end and introduced into its upper end. When in uppermost position each pad is urged firmly into engagement with the lower surface of the glass and assists in supporting it for translation through a distance required for one panel.

A pair of horizontal, laterally spaced tracks 29, one of which appears upon FIG. 1, are mounted at the left end of the machine as viewed upon this figure, at a level above the table. These tracks are fixedly carried by brackets, not show, attached to frame 2. A carriage such as 28 is mounted on each track 29 for guided translation thereby. The two carriages are rigidly interconnected for movement as a unit and pivotally supported between them a shaft 28a. A pair of parallel longitudinally extending, laterally spaced rods have their ends fixed to shaft 28a. The free end of each rod has one of a pair of friction pads 27 attached to it. Each pad is connected with its rod for pivotal movement about a common transverse horizontal axis, thereby assuring that each pad is in full surface contact with the glass. By means not shown, clockwise pivoting of the pads about the axis of shaft 28a is limited so that they are normally slightly above the surface of the glass. However, when a cut panel is elevated by corresponding elevation of pad 24a, pads 27 are brought into contact with the upper surface of the cut panel and assist in guiding it accurately in translation to and over the final or left-hand pair of table sections 3h, 3i, where it may be removed for packaging or installation.

Stope or abutments are provided for engaging and accurately locating the front edge of the advancing ribbon of glass. The first of these is identified as a transversely spaced pair 11, FIGS. 1 and 2. These stops are carried by transverse guide 13 symmetrically upon opposite sides of the centerline of the table and each is vertically movable by any suitable means such as an electromagnet, from a first downward position wherein it engages the forward end of the ribbon of glass, to a second upward position wherein it is free and clear of the glass. These stops are so located that they determine the proper position for the forward edge of a new length or ribbon about to be cut into panels.

A second pair of transversely spaced stops 31, FIGS. 1 and 2, are mounted on the respective ends of a crossarm integrally attached to piston rod 22b and disposed horizontally transverse thereof. These stops are also vertically movable as by electromagnets not shown, from a first elevated position wherein they engage the advancing end of the sheet and temporarily obstruct further movement thereof, to a second or lowered position wherein they are clear of the ribbon. Stops 31 are so located longitudinally of the table that they accurately locate the advancing end of the ribbon in cutting position beneath pattern 12. Of course, other means such as fluid pressure cylinders controller from solenoid valves may be substituted for electromagnets in the operation of stops 11 and 31. In the case of stops 11 there may be provided springs urging each to its upward or second position and moved downward to first position each by energization of its own electromagnet. In the case of stops 31, these may be moved downwardly by gravity and raised to first position each by energization of its own electromagnet.

It has been previously explained that the band of glass surrounding the scored line defining the shaped panel, is fragmented by the brief application thereto of intense heat at points which are judiciously selected to cause the broken pieces to drop away leaving the panel free and intact. These points are, for the panel illustrated, identified at 34, FIG. 2, and are shown as five in number. Of course, the exact number and the location of each will vary in accordance with the size and shape of the particular panels being produced.

Figure 6:
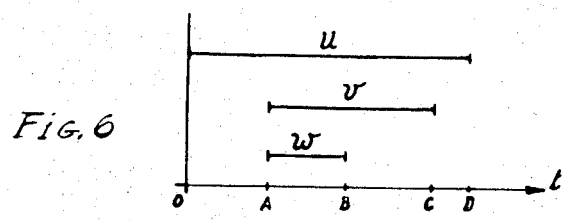
FIG. 6 is a graph showing the time intervals and relation between periods of supply of oxygen, fuel and ignition.
Figure 5:
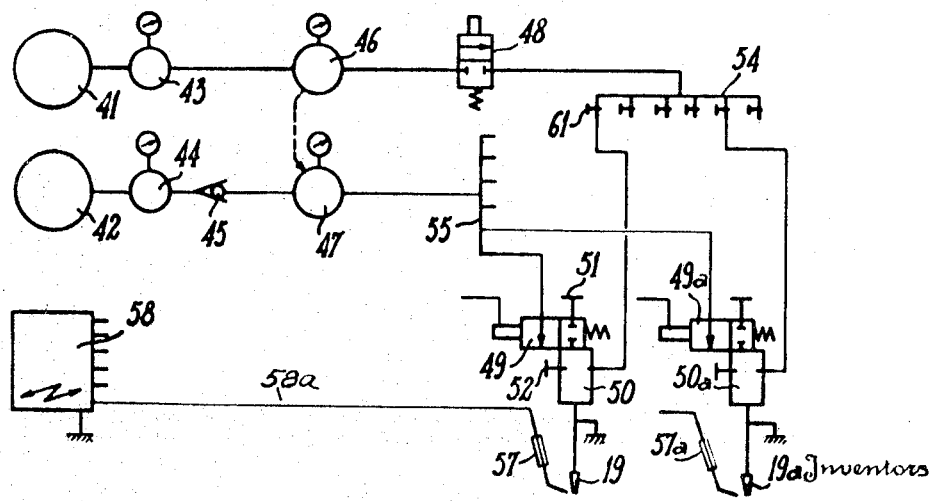
FIG. 5 is a schematic diagram of a modified hook-up of the fuel supply and igniting means shown upon FIG. 4.

FIGS. 4, 5 and 6 disclose suitable means for the application of heat to the selected points. Since all such means are alike and are fed from a common source, a description of one will suffice. In the form there disclosed, a burner nozzle is located at each point 34 to be heated. Two of these nozzles are identified at 19, 19a, FIG. 4. Nozzle 19 also appears upon FIG. 1. During operation in cutting panels of the same size, each nozzle is fixed and directed downwardly so that flame therefrom will impinge upon the band of glass at the selected point. However, the nozzles are adjustable to different locations over and along the glass. In FIG. 1 this adjustment is schematically indicated by the showing of two nozzles fixed to sleeves each of which is mounted on a horizontal, longitudinally extending guide rod 20 carried by brackets attached to frame 2. The specific means by which these nozzles are adjustably fixed at the selected spots 34 may, of course, be embodied in numerous different ways.

Referring to FIG. 4, 41 and 42 identify pressure tanks of, for example, oxygen and acetylene gas respectively, each provided with a pressure-reducing valve 43 and 44. A nonreturn valve 45 is located in the pipe 42a of fuel tank 42. This pipe extends to and through a secondary pressure reducer 47, thence to a solenoid-operated valve 49. From valve 49 a conduit conveys fuel to a mixing chamber 50. Similarly a pipe 41a leads from reducing valve 43 of oxygen tank 41, to secondary pressure reducer 46, thence to a solenoid-operated valve 48. From valve 48 a pipe conveys oxygen to mixing chamber 50. Alternatively valves 48, 49 may be pneumatically controlled.

Chamber 50 is provided with a regulating tap 51 for cutting off the flow of fuel and a second tap 52 for cutting off flow of oxygen. A pipe 50a leads upwardly from chamber 50 and connects at its top end with a header 53. From this header a flexible tube such as 53a, leads to and feeds each respective nozzle 19. A shutoff valve 60 is located in each nipple of header 53.

Thus by proper manipulation or energization of valves 48, 49, acetylene and oxygen may be introduced into chamber 50, there mixed and the fuel-oxygen mixture conveyed to each of the nozzles 19. Means are provided for the automatic ignition of the combustible mixture issuing from each nozzle. In the apparatus shown this means comprises a step-up transformer 58. A plurality of flexible conductors 58a extend from the high-voltage outlet to spark gaps 57, one adjustable fixed adjacent each nozzle. Thus when fuel and oxygen from tanks 42, 41 are admitted to valves 48 and 49, the latter can be automatically controlled by the master controller to pass the gases to chamber 50 where they are mixed and conveyed to each nozzle 19, etc. and the emerging mixture can be ignited by sparks from gaps 57. Proper proportioning of the mixture is effected by adjustment of valves 46, 47. The solenoid or pneumatic valves 48, 49 afford a very precise means by which the periods of admission of oxygen and acetylene can be individually controlled, as well as the times of admission and cutoff of each gas relatively to the other.

FIG. 5 shows schematically a variation of the hook up of FIG. 4. In FIG. 5 the connections up to and including secondary reducing valves 46 and 47 are the same as in FIG. 4. However, oxygen from valve 46 passes to a solenoid valve 48, thence to a header 54 having a plurality of manually operable taps 61. From each tap a pipe leads to a respective one of a corresponding number of mixing chambers 50, 50a, etc., which may be similar to chamber 50, FIG. 4. From each chamber 50, 50a, a flexible tube leads to each corresponding nozzle.

Acetylene or other fuel flows from valve 47 to a header 55 having a plurality of outlets or nipples from each of which a pipe leads to a corresponding one of a plurality of solenoid valves 49, 49a, etc. The outlet from each valve such as 49 leads directly to its chamber 50 for mixing with oxygen coming from header 54. In fact, each valve and its mixing chamber may be in the form of an integrally united structure having a common casing. By this construction there is provided the great advantage that the period of flow of fuel to each of the nozzles can be individually controlled. Also it enables the time relation of flame from each nozzle to be regulated so that, for example, heat can be applied to all points 34 simultaneously or in a desired or preselected sequence.

FIG. 6 is a graph showing the periods of admission of oxygen and fuel and the time relations therebetween. Line U represents the period of feeding of oxygen, V the corresponding period of feeding of fuel, and W the period of ignition. For example, OA on the time-abscissa scale represents a period of from 0.5 to 5 seconds; AB=W represents from 0.2 to 2 seconds; AC=V, from 0.5 seconds up, and CD from 0.5 to 5 seconds. The total time period for each burning cycle is therefore from about 6 to 10 seconds.

Inspection of the graph shows that, in FIG. 5 for example, valve 48 is first opened to admit oxygen directly to mixing chamber 50, from whence it flows to the nozzles; and 0.5 to 5 seconds after opening of valve 48, valve 49, 49a, etc. are opened to admit fuel to each chamber 50, 50a for a duration of from 0.5 seconds up to a short period before cutoff of oxygen. At the instant that fuel valves 49, 49a open, the circuits to spark gaps 57 are closed so that the issuing mixture is immediately ignited and an intensely hot flame is applied to each point 34 on the band of glass encircling score line 32. Ignition may be for a relatively short period of 0.2 to 2 seconds after which burning continues until the supply of fuel is cut off. FIG. 6 also shows that the flow of oxygen begins a substantial time period before the flow of fuel and continues for a short time after flow of fuel has been cut off.

There are numerous advantages in the time relation of flows of gases disclosed. Some of these are, economy of fuel, absence of fouling of the apparatus, particularly nozzles 19, lessening of pollution of the ambient atmosphere by fuel and its products of combustion, absence of carbon deposits upon the parts and freedom from all danger of explosion. Furthermore all piping is flushed clean of fuel at each cycle so that a precise control of the heating cycles is assured.

The tool shown at FIG. 7 forms an important part of the invention and has been previously mentioned. As shown upon this figure the tool is a generally cylindrical item with both ends having carbide tips conically shaped with an apex angle $\alpha$ of from 150° to 160°. The force applied during cutting is important also. Applicants have discovered that this force should be of the order of 10 to 25 kg. and preferably between 14 and 16 kg. This force can be precisely and automatically controlled by the hydraulic or pneumatic cylinder which urges the tool into contact with the glass. The force will vary somewhat in accordance with the angle $\alpha$, the composition of the glass, its degree of annealing, and the speed of linear travel of the tool about the pattern. With selection of proper values applicants have found that the fissure produced by the tool propagates to great depth within the glass and usually extends to the opposite face thereof. This is important in carrying out the method, first, because the deep fissure acts as a heat dam to prevent any substantial amount of heat from flowing to the panel itself and, secondly, because the fissure results in clean and facile separation of the fragmented band from and along the edge of the panel. The cut made is extremely smooth and accurate, and nearly perpendicular to the surface of the glass so that no subsequent operations such as grinding of the cut edge are required.

OPERATION

The operation will be generally clear from the foregoing description and is resumed as follows. Since all controls may be electrical, the master controller may be simply a cylinder of dielectric material mounted for relatively slow rotation by a motor and having axially spaced conducting strips each making contact with a respective one of a number of brushes and of the proper circumferential extent to close the circuits to the corresponding valves, etc., in proper sequence.

At the start of cutting a long or continuous ribbon of glass, the ribbon is initially adjusted so that one side edge thereof is in contact with guide 30 and its forward end edge engages stops 11 which are initially lowered. With the selected pattern fixed in place, the machine adjusted for operation, and tanks of oxygen and fuel connected, the master controller is started by closing a switch in the circuit of its driving motor. The controller then takes charge to continue cyclic operation as long as the switch of its driving motor is closed.

First, blower 21 is started and abutments 11 are elevated clear of the glass by energizing the solenoids which raise or retract them. Simultaneously, valve 26 is adjusted to the full-line position of FIG. 1, to supply above-atmospheric pressure to table sections 3 and thus to support the sheet on a cushion of air. Next, friction pad 9 is elevated into engagement with the undersurface of the sheet, following which pressure fluid is introduced through a solenoid valve, to the right-hand end of cylinder 8 and exhausted from its other end. Slide 9a and pad 9 with ribbon of glass attached are thus translated to the left.

At this time stops 31 have been elevated into the path of the advancing end of the ribbon and act to stop it in proper position for the incision of a score line therein. Valve 26 is next adjusted to supply vacuum or sub atmospheric pressure to conduit or header 4 thus holding the ribbon firmly in adjusted position upon the table. Pad 9 is released, lowered and pressure fluid introduced to the left end of cylinder 8 to return the pad to its initial position shown. Stops or abutments 31 may then be lowered or, alternatively, left in elevated position until incision of the score line is completed.

Motor 17 is next energized and fluid pressure is applied through a solenoid valve, to the splined sleeve or holder 77 carrying tool 1, to lower the latter into contact with the glass and to drive the friction wheels causing the entire tool assembly 16 to move as a unit along the pattern in guided contact therewith as the tool rotates.

As soon as the tool has made a full traverse of the pattern the valve controlling pressure fluid forcing the tool into contact with the glass is instantaneously actuated to release the pressure and to elevate the tool clear of the glass. Pressure fluid is next introduced to the cylinders of pads 23, 24 and 24a to move them into firm contact with the glass and valve 26 is actuated to apply above-atmospheric pressure to the table sections to again support the ribbon. If desired, pad 9 may also be raised into contact with the glass and moved synchronously with pads 23, 24, to further assist precise and positive translation of the ribbon.

The solenoid valve controlling admission of fluid to cylinder 22 is now energized and piston 22a is forced to the left, FIG. 1, until the ribbon, with scored panel and surrounding band of glass, is over table sections 3f, 3g. Valve 26 is then adjusted to apply vacuum to the table sections thus again holding the ribbon firmly to the table. Pads 23, 24 and 24a, and pad 9 if this is used, are lowered free of the glass and pressure fluid is passed to the left end of cylinder 22 and exhausted from its right end, to return these pads to the initial positions shown, FIG. 1. As previously stated, the translation of the ribbon may be a minimum so that as little as 1 cm. of space occurs between contiguous scored lines of successive panels.

Simultaneously with return of the pads, tool 1 is moved with the predetermined force into contact with the glass to initiate scribing or cutting of a second panel. On completion of the second cut the tool is again raised from the glass, pads 23, 24, etc. are raised to engage the ribbon, and valve 26 is adjusted to apply above-atmospheric pressure to table sections 3. Cylinder 22 is then energized to again advance the ribbon by the preset distance until the first panel is over table sections 3h, 3i, and the second panel is over sections 3f, 3g.

Vacuum is again applied to the table sections by adjustment of valve 26 and pads 23, 24, 24a are released and returned to initial positions. Simultaneously with initiation of cutting of a third panel, valves 48, 49, 49a, etc. are opened and the circuit to spark gaps 57 is closed, all in proper sequence, to apply heat at points 34 to the band of glass encircling the first panel. The shock of expansion due to heat causes the band to fracture at the selected points and to drop away in sections, leaving the panel free and intact. This step takes place while a third panel is being cut.

Pads 23, 24, 24a are again raised to grip the ribbon and valve 26 is adjusted to apply above-atmospheric pressure to the table sections. Simultaneously, pads 27 are lowered to contact and grip the first and completed panel and moved synchronously with pads 23, 24 and 24a to at one and the same time translate the ribbon to a position for the cutting of a fourth panel, and the completed first panel to a position over table sections 3j, 3k, from whence it may be automatically conveyed to a place of packaging or installation.

The cycles thus described are repeated throughout the length of the ribbon or until the desired supply of panels is provided. Of course the operation of pads 27 and valves 48, 49, etc. has no effect until the first panel arrives over table sections 3h, 3i.

The foregoing description of operation is by way of example only. The precise sequence of operations is variable to a certain extent and some, such as cutting and return of pads 23, 24, etc. to initial position will occur simultaneously and thus reduce the overall time for each cycle. It is contemplated that pads 9, 23, 24 and 24a may be of the suction cup type, connected with a common source of vacuum under control of a solenoid valve energized at the proper times by the master controlled, to thus ensure a firmer grip of these pads upon the glass.

We have thus provided a very useful, versatile method and apparatus fulfilling all of the objects stated, and by which the cutting of a ribbon of glass into successive panels of predetermined shape and size is made fully automatic and requiring an absolute minimum of personnel and attention. The successive cycles can be repeated indefinitely, as in the case where a ribbon of glass is continuously supplied from a furnace, annealed, ground and polished in successive steps, then passed directly to the machine of the present invention. It is of particular importance to note that since the first panel in the example given is not separated from its band of glass until and while the third panel is being out, there is a material saving of time and no possible interference occurs between the cutting and breaking away functions.

While we have disclosed the preferred form of the invention as presently know to us, numerous other uses, modifications, variations, alterations and substitutions of equivalents will readily occur to those skilled in the art after a study of the forgoing specification. Hence the disclosure should be taken in an illustrative rather than a limiting sense; and it is out desire and intention to reserve all changes within the scope of the subjoined claims.

Having now fully disclosed the invention, what we claim and desire to secure by Letters Patent is:

1. An apparatus for cutting an elongated ribbon of glass into sequential sections of predetermined contour each, comprising, a frame, a table carried by said frame and having a flat horizontal top, a rigid pattern having a rim corresponding to said contour, first means mounting said pattern horizontally over and adjacent to said table and a ribbon of glass thereon, a scribing tool, second means mounting said tool on said frame for universal horizontal movement and for guided contact with and by the rim of said pattern, a friction pad releasably engageable with a sheet on said table, means fixed with said frame and connected with said friction pad to translate the same and the glass engaged thereby, through a distance required for the scribing by said tool of a contoured section from the sheet, said table comprising a chamber closed except for a series of regularly spaced orifices through the flat top thereof, a blower, a conduit connecting said blower to said chamber, and a valve in said conduit operable to alternatively connect said chamber to the intake or the exhaust from said blower.

2. A machine for the cutting of a ribbon of glass sequentially into panels of predetermined contour each, comprising, a table having a flat horizontal top and a longitudinal horizontal central axis, first and second horizontal transverse guides spaced along said axis in positions over said top, a first pair of tracks each fixedly carried by a respective one of said guides, means carried by said first pair of tracks to fixedly and adjustable support a pattern over and in parallel relation with said top, a second pair of tracks each fixed with and upstanding from a respective one of said guides, a bridge jointly mounted by said second pair of tracks for horizontal guided translation therealong, normal to said axis a cutting tool assembly mounted on said bridge for guided horizontal translation thereby, parallel with said axis, said assembly including a cutting tool movable into contact with a ribbon of glass on said table, a motor connected with said tool to rotate the same, and roller means connected with said motor and frictionally engageable with a pattern carried by said first pair of tracks to propel said tool in a path guided thereby to correspondingly score the glass therebeneath.

3. The machine of claim 2, said cutting tool assembly being positioned at a first station over said table, means operable to releasably engage a sheet on said table and to translate a line scored therein by said tool, successively to second and third stations, step by step, and along said central axis, and means positioned over said third station to apply heat to the glass at points spaced along the score line therein.

4. The machine of claim 3, said last-named means comprising a plurality of burner nozzles, one at each said point and directed downwardly toward a ribbon of glass thereon, conduit means connectable with discrete sources of fuel and oxygen to supply a combustible mixture to each said nozzle, a plurality of spark gaps one adjacent each respective nozzle, and high-voltage circuit means including said spark gaps.

5. The machine of claim 4, said conduit means including a mixing chamber, a header, a pipe from said chamber to said header, a plurality of pipes each connecting said header with a respective one of said nozzles, first and second tubes each connected at its one end with said chamber and adapted for connection with sources of fuel and oxygen respectively at its other end, and a pair of automatically controllable solenoid valves, one in each said tube.

6. The machine of claim 4, said conduit means comprising first and second headers, first and second tubes each connected at one end with a respective one of said headers and at its other end adapted for connection with a source of fuel and oxygen, respectively, a plurality of mixing chambers, a first plurality of pipes each connected at one end to said first header and at its other end to a respective one of said mixing chambers, a second plurality of pipes each connected at one end to said second header and at its other end to a respective one of said mixing chambers, and a plurality of conduits each connecting a respective one of said mixing chambers to a corresponding one of said nozzles.

7. The machine of claim 6, said first tube having a first solenoid valve therein, and a plurality of solenoid valves, one in each of said second plurality of pipes.

8. In an apparatus for cutting an elongated ribbon of material into sequential sections of predetermined contour, a frame, a table carried by said frame, a pattern mounted over said table in parallel therewith, a scribing tool, first means mounting said tool on said frame for guided contact with and along said pattern, second means operable to advance said ribbon on and along said table step by step to a series of sequential positions beneath said pattern, for scribing by said tool, said scribing tool having a conical cutting tip with apex angle of from 150° to 160°, said first means including rotary means mounting said tool for rotation about the axis of its cutting tip, said axis being essentially normal to the plane of said table, and means connected with said tool for rotating the same.

9. The apparatus of claim 8, said tool being mounted for translation along said axis, toward and from said table, and means operable to urge said tool in translation along said axis with selectively variable force into contact with a ribbon of material on said table.

10. The apparatus of claim 9, said force being from 10 to 25 kg., and preferably from 14 to 16 kg.

11. The apparatus of claim 9, said force being selected to create a fissure in the ribbon of material extending substantially completely through the material to the opposite face thereof.

12. In an apparatus for cutting an elongated ribbon of material into sequential sections of predetermined contour, a frame, a table carried by said frame, a pattern mounted over said table in parallel therewith, a scribing tool, first means mounting said tool on said frame for guided contact with and along said pattern, second means operable to advance said ribbon on and along said table step by step to a series of sequential positions beneath said pattern, for scribing by said tool, said scribing tool having a conical cutting tip with apex angle of from 150° to 160°, said first means including means mounting said tool for rotation about the axis of its tip, essentially normal to the plane of said table, and for translation along said axis toward and from said table, and means engaging said tool and operable to urge the same toward said table and a ribbon of material thereon, with selectively variable force.

13. The apparatus of claim 12, said last-named means being capable of exerting a force of said tool, of from 10 to 25 kg.